UNITED STATES PATENT OFFICE.

JEAN RÉNÉ MOÏSE, OF PARIS, FRANCE.

PROCESS OF MAKING CYANIDS.

SPECIFICATION forming part of Letters Patent No. 591,675, dated October 12, 1897.

Application filed June 9, 1896. Serial No. 594,860. (No specimens.) Patented in France April 12, 1895, No. 246,587; in Belgium September 27, 1895, No. 117,636, and in England October 12, 1895, No. 19,201.

*To all whom it may concern:*

Be it known that I, JEAN RÉNÉ MOÏSE, a citizen of the Republic of France, residing at Paris, in the Republic of France, have invented certain new and useful Improvements in Processes for the Manufacture of Cyanids, (for which I have obtained a patent in France, No. 246,587, dated April 12, 1895; in Belgium, No. 117,636, dated September 27, 1895, and in Great Britain, No. 19,201, dated October 12, 1895;) and I do hereby declare the following to be a full, clear, and exact description of the invention, such as will enable others skilled in the art to which it appertains to make and use the same.

The present invention has for its object to replace the methods hitherto employed in the manufacture of cyanids and ferrocyanids of alkalies and of their compounds. The new process offers the advantage of a great simplicity in the manufacture and permits of obtaining these products at a reduced price.

The process can be divided into two steps—first, the manufacture of borid of nitrogen for obtaining the cyanids; second, the manufacture of the cyanids.

In order to obtain the borid of nitrogen, I prepare an intimate mixture of fine powder of biborate of soda and of hydrochlorid of ammonium. The following are preferable proportions: biborate of sodium, one hundred pounds; hydrochlorid of ammonium, one hundred and fifty pounds. It is evident that these proportions may vary according to the purity of the material employed without departing from the nature of the invention. I can also employ the borate of soda or the borate of potassium. The mixture is calcined in a suitable retort provided with a tube communicating with a chamber of condensation, so that the parts of hydrochlorid of ammonium, which escape by evaporation at the beginning of the reaction, are condensed in the well-known manner, and that the hydrochlorid gathered in the chamber of condensation can be used again in a subsequent operation. When the calcination is finished, the retort may be opened, and from it a mass of a grayish-white color can be withdrawn, being porous and full of cavities, said mass being an impure mixture of borid of nitrogen and chlorid of sodium, (BN+NaCl.) The borid of nitrogen can also be manufactured by leading a jet of hydrochlorid of ammonium upon molten borax or biborate of soda in making use of an inert gas to produce the jet. The product reduced to powder is placed in a suitable vessel, which may be provided with stirring devices, and is therein brought in contact with boiling water having a small addition of muriatic acid in order to separate the insoluble borid of nitrogen from the chlorid of sodium. The insoluble borid of nitrogen contained in this liquid is separated in a filter-press and the chlorid of sodium or chlorid of potassium, in case borate of potassium has been employed, is secured by evaporation.

To proceed afterward to the manufacture of the cyanids, I take borid of nitrogen as obtained previously, about fifty pounds; carbonate of potassium, two hundred and fifty pounds; lampblack or any other body containing much carbon, thirty pounds. It is evident that here also the proportions can vary according to purity of the bodies employed. I mix the whole intimately after pulverization, and if I want to produce ferrocyanid I add iron filings, about ten per cent. of the weight of the whole mass. I thereupon calcine the mixture in a suitable apparatus. The operation should last about one hour at a temperature of dark red, whereupon the mass, being composed principally of borate of potassium and of cyanid of potassium, may be withdrawn.

The reaction taking place is fully explained by the following equation:

$$4BN + 3(CO_3K_2) + 2C = B_4O_7K_2 + 4(KCN) + CO_2.$$

I treat the product obtained by the second step of manufacture with alcohol, which retains the cyanid in solution and allows the insoluble biborates to be filtered off.

When iron filings have been added, as above stated, the mass after calcination contains ferrocyanids and borates, which I separate by crystallization in the well-known manner, the ferrocyanids being less soluble than the borates.

The advantages of this invention resulting from the new method of manufacture are obvious, because I manufacture the cyanids directly without producing previously the ferrocyanid. It is also of great importance that the quantity of cyanids obtained by the new process is more than double the quantity obtained from the animal matter used heretofore.

It may be said also that from the new process a great economy results in the manufacture, because the materials employed in it are regained almost totally and the biborates can be used again in a series of the steps of manufacture of borid of nitrogen. Moreover, an important quantity of chlorid of sodium or of potassium is obtained, according to the use of one or the other of these alkali salts, and as their state is chemically pure it can be sold at a respectively high price.

Having thus described my invention, I claim—

1. The herein-described method of manufacturing the cyanids of alkalies and their compounds, which consists in the production of the borid of nitrogen, by calcining a mixture of biborate of sodium and of hydrochlorid of ammonium, separating the borid of nitrogen from the chlorids by treatment with boiling water having a slight addition of hydrochloric acid, and filtration afterward, making an intimate mixture of the borid of nitrogen, thus obtained with carbonate of potassium and carbon and by heating said mixture to a dark red, thereby transforming the mixture into a combination of cyanids and borates, and separating the cyanids from the borates by crystallization.

2. Process of a direct manufacture of ferrocyanids, which consists in preparing a very intimate and pulverized mixture of borid of nitrogen, of carbonate of alkali, of carbon, and of iron filings, in calcining said mass at a dark-red heat, and in separating the formed ferrocyanids from the borates by means of crystallization, substantially as described.

In testimony whereof I affix my signature in presence of two witnesses.

JEAN RÉNÉ MOÏSE.

Witnesses:
G. BROWN,
CLYDE SHROPSHIRE.